Jan. 8, 1963 W. W. LEVY 3,072,017
ADJUSTABLE MIRROR
Filed June 7, 1961 2 Sheets-Sheet 1

INVENTOR.
William W. Levy
BY Scott L. Norvid
Atty

Jan. 8, 1963 W. W. LEVY 3,072,017
ADJUSTABLE MIRROR
Filed June 7, 1961 2 Sheets-Sheet 2

INVENTOR.
William W. Levy
BY Scott L. Norviel
Atty

United States Patent Office 3,072,017
Patented Jan. 8, 1963

3,072,017
ADJUSTABLE MIRROR
William W. Levy, Phoenix, Ariz., assignor of one-half to Edith M. Andrews, Maricopa, Ariz.
Filed June 7, 1961, Ser. No. 115,361
1 Claim. (Cl. 88—97)

This invention concerns an adjustable mirror which, when used in conjunction with a large stationary mirror, will clearly reflect the back of a person's head.

One of the objects of the invention is to provide a bench on which the user can sit in front of a stationary vanity mirror and move a mobile mirror in an arc whereby the back and backsides of the head of the user will be made clearly visible in the vanity mirror.

Another object is to provide a stool or bench with a mirror which will adjustably extend upward relative to the bench and can be adjusted for vertical reflection angles and which is mounted on a vertical arm which is, in turn, mounted on a pivotal arm extending outward from the rear of the bench and which can be operated by mechanism easily accessible to a person sitting on the bench.

Another object is to provide a vanity bench, or stool, with a mirror adjustably supported on a vertical member which is held on a swinging member pivotally supported on the bench so that the mirror and its support will move in an arc around the back of the bench and thereby enable the user to view the back of her head from any angle desired.

Other objects will appear hereinafter.

Figure 1:
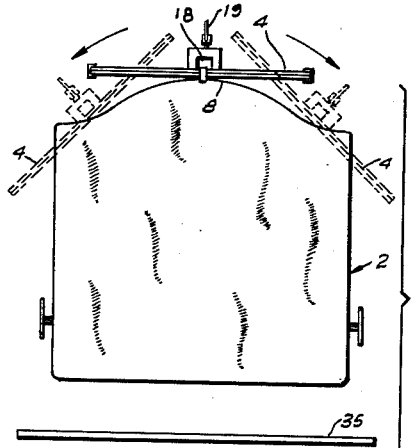
Figure 2:
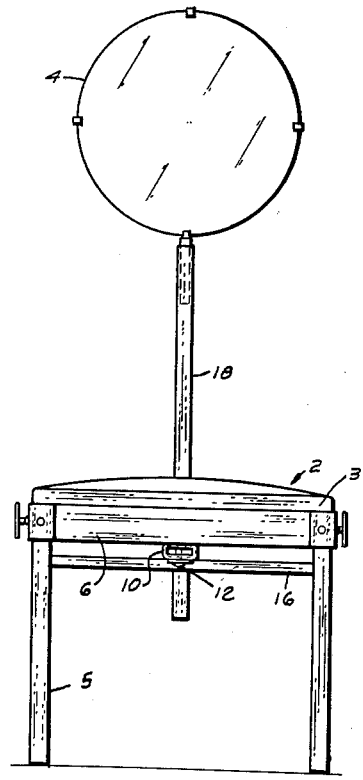
Figure 3:
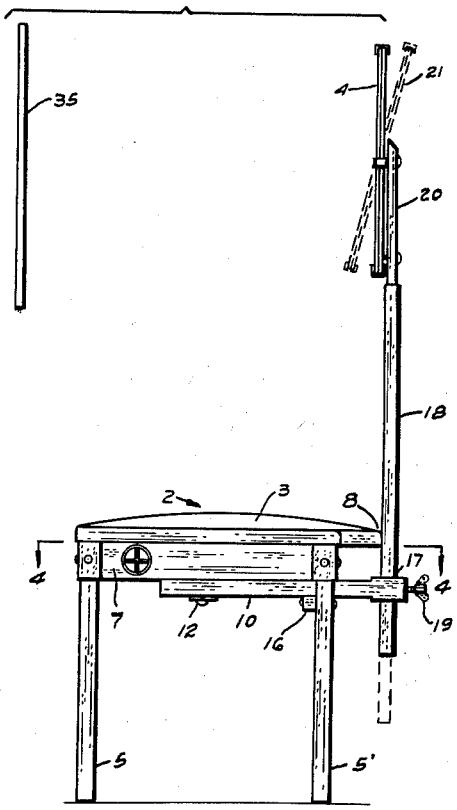
Figure 4:
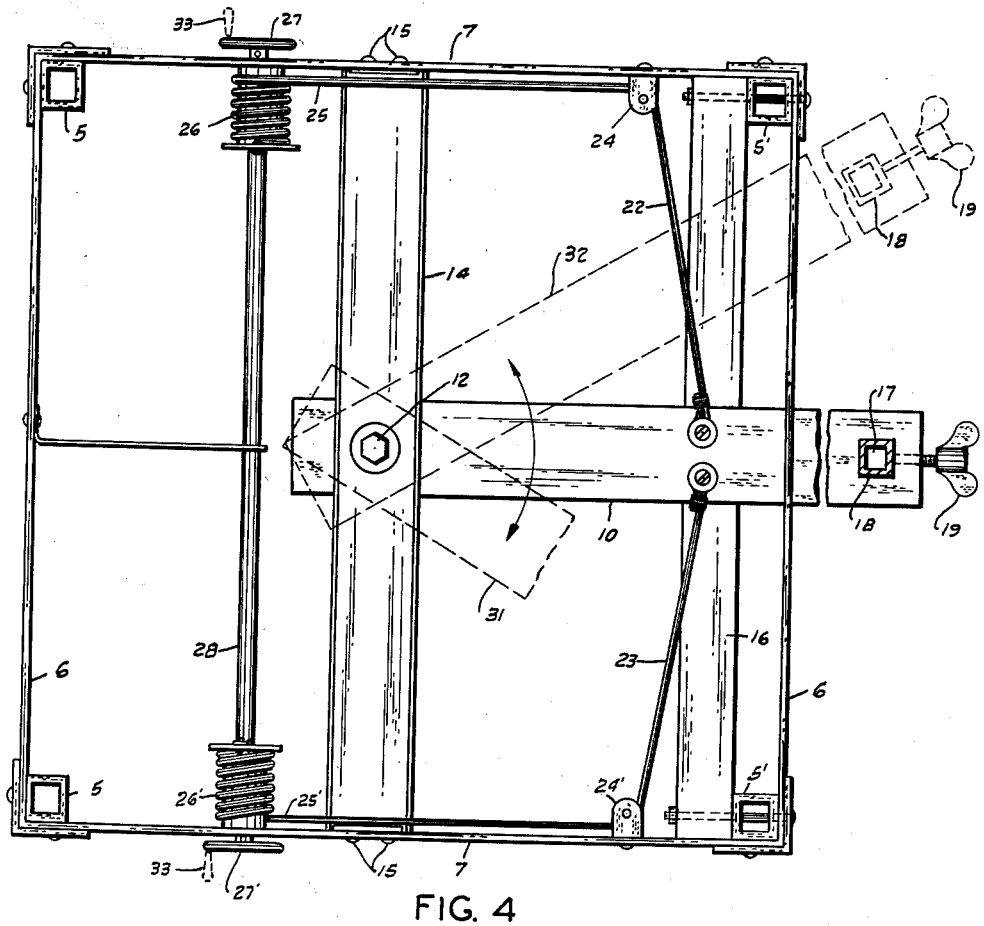
Figure 5:
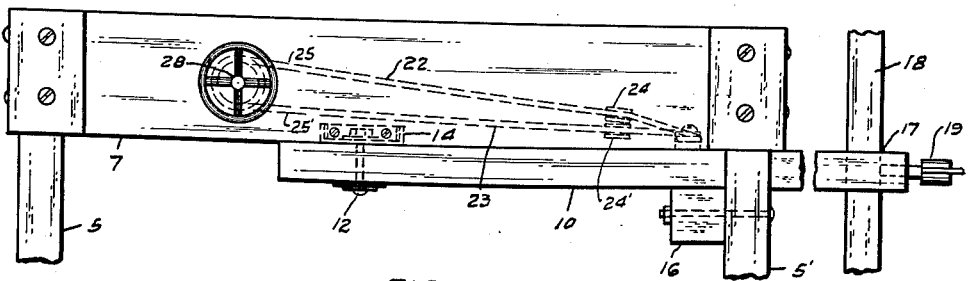

I attain the foregoing objects by means of the device, parts and combinations of parts shown in the accompanying drawings, in which:

FIGURE 1 is a plan view of the bench and mirror;
FIGURE 2 is a front elevational view of the bench and mirror and supports;
FIGURE 3 is a side elevational view of the bench, mirror and supports;
FIGURE 4 is a plan view of the bench with the top removed and sectioned from the legs supporting portion on lines 4—4 of FIGURE 3, drawn on an enlarged scale; and
FIGURE 5 is a side elevational view of the bench supporting portion with the top removed and drawn on an enlarged scale.

Similar numerals refer to similar parts in the several views.

In the device as shown in the first three figures 2 indicates the bench in general; 3 indicates the top of the bench; and 4 indicates the movable mirror here concerned.

The bench is provided with legs 5 secured at the top by transverse rails 6 and longitudinal rails 7. The top 3 of the bench is substantially rectangular but has a curved rear edge 8.

Beneath the bench there is a pivoted supporting arm 10 which is pivoted on bolt 12. Bolt 12 is secured to a transverse support 14 at a point midway between its ends. The ends of support 14 are secured to the lateral or side rails 7 by fastening means such as bolts or screws 7.

It will be noted that the member 10 extends rearwardly from its pivotal point of support 12 and extends beyond the rear edge 8 of the top 3. To support the weight of this member and of parts supported by it, I provide a transverse supporting rail 16 which extends from one of the back legs to the other. The rear end of member 10 is slidably supported on the top of this transverse supporting bar 16.

At the rear outer end of the member 10 there is a hole 17 which is sized to receive the vertical mirror supporting member 18. This member extends through the hole 17 and a lock screw 19 is used to maintain it in fixed position as desired.

Since the vertical supporting member 18 is slidably supported in the hole 17 the height of the mirror 4 attached to the top of the vertical member 18 can be varied by loosening the screw 19.

Mirror 4 is attached to the top of the vertical member 18 by a ball and socket swivel support 20, or its equivalent, such as, for example, a U-shaped bracket with a cross beam pin to pivotally support the mirror. This type of support is used so that the angle of the mirror may be varied vertically as indicated by dotted lines 21, FIGURE 3. In order to swing the pivotally supported member 10 from right to left, I provide a pair of cords or pliant material such as nylon. These are marked 22 and 23 and are attached near the end of pivoted member 10 approximately over the transverse support 16. Cord 22 then goes over a laterally disposed pulley 24 and thence extends forwardly of the bench, as shown at 25, and its front end is wound in a counter clockwise direction around spool 26. Cord 23 extends to the pulley 24' on the opposite side of the stool frame and thence extends forward as at 25' to the spool 26' on transverse shaft 28. The cord 25' is wound around spool 26' in a clockwise direction so as to wind up when the hand wheel 27 on the end of shaft 28 is turned in a clockwise direction. When this is done the winding on spool 26 unwinds so as to release cord 22.

This structure permits one cord, for example 23, to be wound up on its spool 26' while the other cord 22 is unwound and this arrangement will draw the support 12 to the right, as indicated by the dotted lines 31.

Conversely, rotation of hand wheel 27' or 27 will cause cord 22 to be wound on spool 26 while cord 23 is unwound from spool 26' and consequently the support 12 will move to the position 32. Each of the hand wheels 27 and 27' may be provided with cranks 33, if desired.

From the foregoing it will be understood that a person seated on the bench top 3 can reach either hand wheel 27 or 27' and rotate it so as to swing the support 10, the support 18 and the mirror 4 in an arcuate path around the back portion of the bench. When the bench is positioned in front of the mirror, indicated by the numeral 35, FIGURES 1 and 3, the reflection from the mirror 4 will be observed in mirror 35 at any desired angle and will therefore show the user, seated on the bench, the back of her head, as desired. After the mirror 4 has been adjusted on vertical support 18, as to height, it is not necessary to make further adjustments. The same is true of the bracket 20 which supports the mirror on the top of the member 18.

Therefore, in ordinary use it is only necessary to manipulate the wheels 27 or 27' in order to view the back of the head.

The top 3 and rails constitute the bench frame. Legs 5 are at the front and legs 5' at the rear. The pivotal member 10 provides a means for supporting vertical staff member 18 which may be termed a vertical mirror supporting member.

Other mechanism than the cords may be used to swing member 10 and the claim is stated broadly with this in mind.

I claim:

A support for a mirror for viewing the back of the user's head by reflection, consisting of a bench, adapted to be disposed in front of a vanity wall mirror, said bench having a top with a front edge and curved rear edge, legs depending from said top, fore and aft, longitudinal rails connecting the top portions of said legs and front and rear transverse rails connecting the top portions of said legs, a transverse support attached to said fore and aft longitudinal rails and disposed forward from the rear transverse rail, a pivot bolt centrally disposed on said transverse support, a mirror supporting arm pivotally supported on said bolt and extending rearward of the rear edge of said top, a transverse supporting bar extending between the top portions of said rear legs of said bench and affording sliding support for the rear portion of said mirror supporting arm, a vertical mirror supporting member on the rear of said pivoted mirror supporting arm, a mirror attached to the upper portion of said vertical mirror supporting member, and mechanism for pivotally swinging said pivoted mirror supporting arm, composed of a transverse shaft extending thru said longitudinal rails and journalled in said rails, hand wheels on the ends of said shaft, spools laterally disposed on said shaft, and cords attached to the outer portion of said mirror supporting arm, extending laterally to laterally disposed pulleys on said bench rails, and thence forward to said spools and wound on said spools in opposite directions so that one spool will wind up one cord while the other spool will unwind the other cord when said shaft is rotated.

References Cited in the file of this patent

UNITED STATES PATENTS

| | | |
|---|---|---|
| 2,161,263 | Simjian | June 6, 1939 |
| 2,218,302 | Simjian | Oct. 15, 1940 |
| 2,510,351 | Simjian | June 6, 1950 |